Dec. 2, 1947.   L. H. HAYWARD   2,431,751
APPARATUS FOR CEMENTING WELLS
Filed June 9, 1941   2 Sheets-Sheet 1
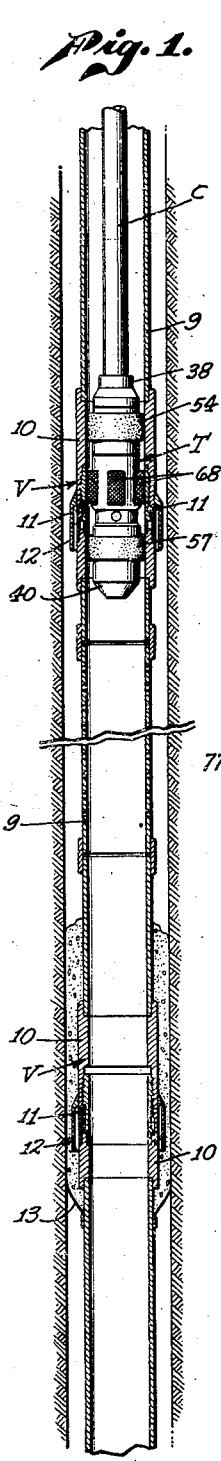
Fig. 1.
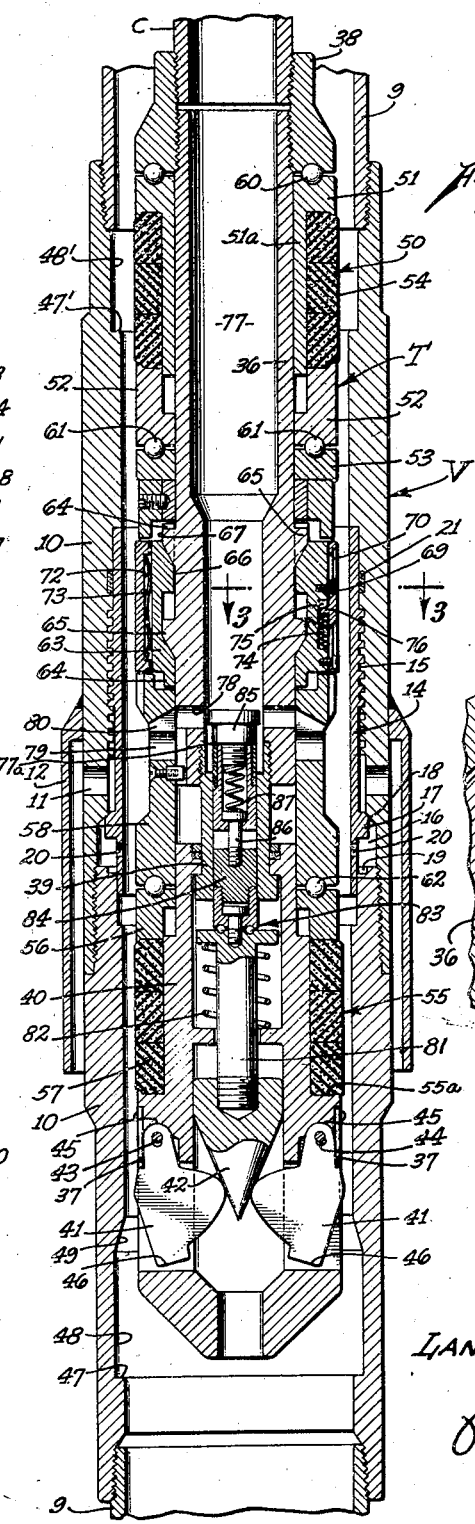
Fig. 2.
Fig. 3.
Inventor
LANDES H. HAYWARD,
Attorney Dec. 2, 1947.   L. H. HAYWARD   2,431,751
APPARATUS FOR CEMENTING WELLS
Filed June 9, 1941   2 Sheets-Sheet 2

Inventor
LANDES H. HAYWARD,

Attorney

Patented Dec. 2, 1947

2,431,751

UNITED STATES PATENT OFFICE 2,431,751

APPARATUS FOR CEMENTING WELLS

Landes H. Hayward, Los Angeles, Calif.

Application June 9, 1941, Serial No. 397,223

16 Claims. (Cl. 166—1)

This invention relates to the cementing or other treatment of oil wells and the like, and more particularly to apparatus for introducing cement between the liner or casing and the walls of the well.

Methods of cementing which require valves in the walls of the casing to be operated by fluid pressure, such as flapper valves, or other one way valves, offer no means for testing the effectiveness of the closure made by the valves. In all of these methods, there is always the doubt that the required amount of cement is put away behind the casing.

It is therefore a primary object of the present invention to provide apparatus for cementing wells which overcomes the above mentioned defects.

It is a further object of the present invention to provide an improved cementing apparatus which will positively position the cement behind the casing.

It is a further object of the present invention to provide an improved cementing device, capable of being set at different stages successively.

It is a further object of the present invention to provide a device which will positively and permanently isolate the cement from the interior of the casing after it has been put in place.

It is a further object of the present invention to provide a device which will accomplish the entire range of operations necessary in cementing by manipulation of the drilling or tubing string and control of the circulation pumps.

It is a further object of this invention to provide an improved cementing device which can be utilized to set different stages of cement without the necessity of withdrawing the entire cementing string after each cementing operation.

It is a further object of the present invention to provide a cementing device which leaves nothing in the casing to be removed by drilling.

It is a further object of this invention to provide a cementing apparatus which can be utilized for circulating in the casing before and after the actual introduction of cement, and which will not disturb the cement which has been positioned in the well outside of the casing.

It is a further object of the present invention to provide a series of improved valve mechanisms in the wall of the casing which can be operated independently of each other.

It is a further object of the present invention to provide an improved cementing tool which can be positively positioned within the well for distributing cement through a valve in the well casing.

It is a further object of this invention to provide a device that forms of itself a fluid tight seal between the interior and exterior of the casing or liner either before the cementing operation or after the cementing operation.

It is a further object of this invention to provide a device which will permit the testing of the seal in the wall of the casing both before and after the cement is put away behind the casing.

It is a further object of the present invention to provide a mechanism which will pack off an area in a casing for the introduction of cement, in which the effectiveness of the packing can be tested before the introduction of cement.

It is a further object of the present invention to provide a device which can pack off a region in the well casing and perform mechanical operations in the packed off region.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawings:

Figure 1 shows a section of a well in the process of being cemented with a device of the present invention;

Figure 2 is an enlarged view of a portion of Figure 1, showing the parts in one position of operation.

Figure 3 is a transverse section of the tool taken on line 3—3 of Figure 1.

In general, the present invention contemplates the provision of one or more valves in the well casing at spaced intervals therealong, and the utilization of a special tool attached to the cementing string. This tool carries packers and other instrumentalities, so that in operation it is possible to go through a routine consisting of circulating, testing the packers against a blank part of the casing, packing off the casing above and below one of the valves in the casing, testing the effectiveness of the closed valve between the set packers, opening the valve, introducing cement through the walls of the casing, closing the valve, testing the effectiveness of the closed valve seal, and then releasing the packers and washing excess cement from the interior of the casing and from the cementing string. After all this has been done, the tool may then be moved from the valve, and the operations repeated in conjunction with another valve, and so on, until the entire well has been cemented.

Figure 4:
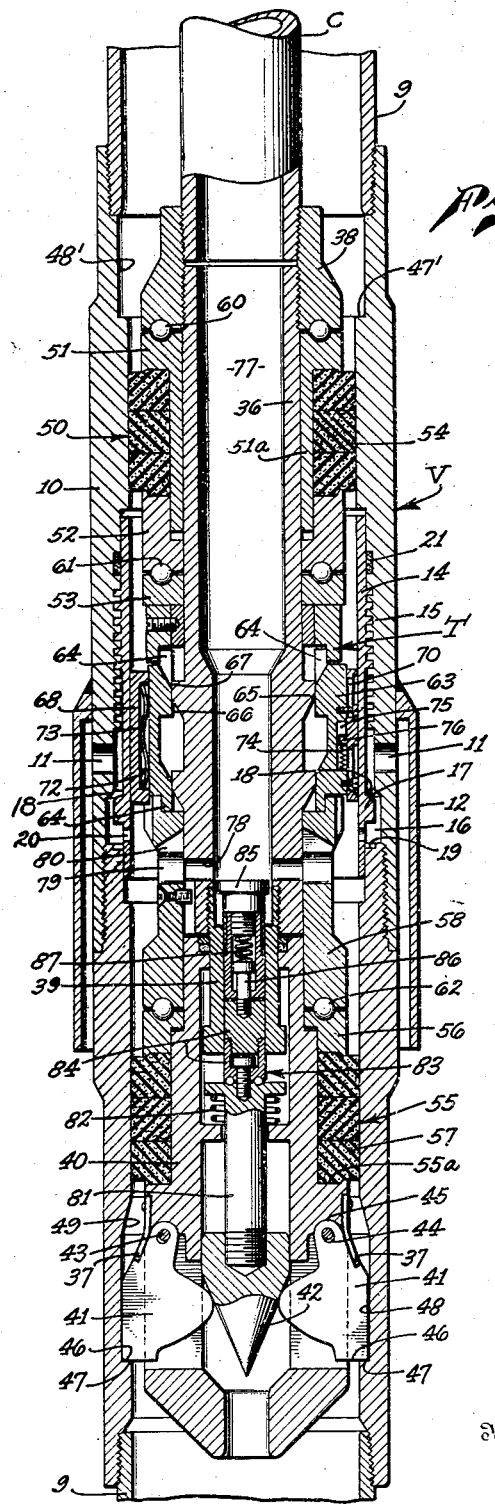
Figure 4 is a view similar to Figure 2, with the parts in a different position of operation; and, Figure 5 is an enlarged fragmentary section of a modification of the device shown in Figures 1 to 4.
Figure 5:
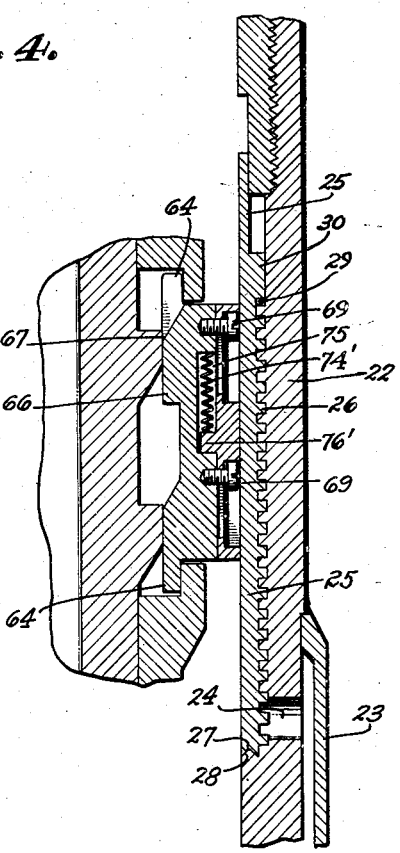

The valves are incorporated in special fittings V, which are coupled in the casing string 9 as the casing is run into the hole. Each of these fittings is provided with ports, and a mechanism for closing the ports. The mechanism for closing the ports is positively controlled from the surface of the ground by the special tool T, which is coupled to the cementing string C. There are two forms of valve shown in the drawings. That shown in Figures 1 to 4 is both opened and closed by turning the tool T in the same direction, while that shown in Figure 5 is opened by turning the tool in one direction, and closed by turning the tool in the opposite direction.

Referring first to the form of valve illustrated in Figures 1 to 4, this type of valve may be run into the well closed, and left closed until it is desired to open it for the purpose of putting away the cement, at which time it may be opened by a turn to the right. After the cementing operation is completed, it may be closed by a further turn to the right. It is desirable to run the valve closed, rather than open, since this permits testing of the packers with the valve between them, before cement is pumped down the string C. After the valve is closed, the seal may be again tested.

The valve fitting V comprises a body portion 10 threaded or otherwise coupled with the casing string 9. This body 10 is provided with ports 11, and may be provided with a discharge tube 12, to direct the cement toward a wall packer or basket 13, as shown in Figure 1. Within the body 10 a sleeve or valve member 14 is mounted, with cooperative threads 15 between the body 10 and the sleeve 14, so that rotation of the sleeve with respect to the body will cause the sleeve to travel axially along the body. In order to so rotate the sleeve, it is provided with knurling or other roughening on its interior surface, which is intended to be gripped by the cementing tool for rotation. The body portion 10 has an annular recess 16 formed in its interior, to one side of the ports 11, and the extent of this recess is sufficient to permit the required flow of cement through the ports 11.

The flow of fluid through the valve is prevented when desired by a sealing ring 17, mounted on the sleeve 14. Shoulders 18 and 19 are formed at opposite ends of the recess 16, for engagement by the sealing ring 17, at either end of its travel. Thus, if the sealing ring is in engagement with either shoulder 18 or shoulder 19, it will prevent flow through the recess 16, and thus through ports 11. Ports 20, through the sleeve 14, to one side of the sealing ring 17, provide communication between the recess 16 and the interior of the casing.

The above construction will prevent leakage of fluid which enters the recess 16 through ports 20. In order to prevent leakage down the threads 15, a packing ring 21 is provided in the body 10, engaging sleeve 14. This form of packing is sufficient, due to the long path fluid must take to pass through the threads 15.

If the valve is run into the well bore with the sleeve 14 in the position shown in Figure 2, it can be seen that engagement between the sealing ring 17 and the shoulder 18 will prevent flow through the ports 11 and 20, and the interior of the casing is entirely isolated from the exterior thereof. When it is desired to open the valve, it is necessary to rotate the sleeve 14 sufficiently to cause the sealing ring 17 to assume a position intermediate the shoulders 18 and 19, as shown in Figure 4. Flow will then be permitted through the ports 20, through the recess 16, and thence out the ports 11. When cementing is completed, it is merely necessary to rotate the sleeve 14 further in the same direction, which will cause engagement between the ring 17 and the other shoulder 19, thus effectively closing the valve through the wall of the casing.

In the event that there is no objection to rotating the cementing string in opposite directions, the valve may take the form fragmentarily shown in Figure 5. In this form, the valve body 22 is secured to the casing in the same manner as the form shown in Figures 1 to 4. A discharge tube 23, and a series of ports 24 in the valve body 22, provide for the passage of cement from the interior to the exterior of the casing. Within the valve body 22 is a sleeve 25, threadedly engaging the interior of the body 22 by means of threads 26, so that rotation of the sleeve relative to the body causes axial movement of the sleeve relative to the body member. At one end, the sleeve 25 is provided with a machined surface 27 adapted to cooperate with a corresponding surface 28 on the valve body 22, to form a fluid tight seal. Thus when the sleeve is rotated to bring its end 27 against the sealing surface 28, passage of fluid through the ports 24 is prevented, thus effectively closing the communication between the interior and exterior of the casing. Leakage of fluid past the threads 26 can be prevented by the provision of a packing ring 29 between a shoulder 30 on the sleeve 25 and a shoulder on the body member 22, such as that presented by the top of the threads 26. This type of valve construction can be operated by running it in the casing in the closed position, opening it by a turn to the left, and closing it by a turn to the right. In the event that it is possible to run the valve open, the left turn can be dispensed with, and the device simply closed after the cementing operation is completed. In order that the sleeve gripping means on the tool T be capable of turning the valve sleeve 25, the interior of this sleeve is also roughened by machining, knurling, or any other type of surface treatment desired.

With either of the foregoing valve constructions, it is seen that there is a positive closure against fluid flow in either direction when they are closed, and that either valve may be opened or closed by control of the tool T at the end of the cementing string C. This enables positive control of the valve openings, and at the same time provides a means for testing effectiveness of the valve seal after the cement is put away. If the valve be closed, it is a simple matter to run the circulating pumps, and determine whether there is a leak at the valve. If there is no leak, it is positive assurance that the cement will stay behind the casing when the packers are removed and the tool moved to another position.

As can be seen from what has gone before, it is necessary to provide a tool which can be lowered on the cementing string, to perform several functions. There must be some means of assuring that the tool packs off the region to be treated, and some means for testing the packing. There must also be a means for opening and closing the valve whilst the tool packing defines a region in communication with the valve ports. There must be a means for testing the valve closure when cementing is completed. It is also necessary to provide a tool which will permit circulation before and after cementing.

Considering first function of packing off the casing, the tool T comprises an upper mandrel 36, attached to the drill pipe or cementing tubing C by means of a collar 38. Secured to the lower end of the mandrel 36 is a headed member 39, which slidably mounts a second mandrel or body member 40. It is proposed to utilize relative axial movement between the lower mandrel 40 and the upper mandrel 36 to pack off a confined area within the casing in communication with the ports 11 of the valve and the interior of the cementing string. Such relative movement is accomplished by stationarily supporting the lower mandrel 40 in the casing, and lowering the cementing string C to which the upper mandrel is attached. The means employed to secure the lower mandrel against downward movement, comprises dogs or projectible elements 41 which are pivoted to the lower mandrel 40, and are moved into engagement with the casing by a cone member 42, in a manner hereinafter fully described. These dogs 41 are supported on the mandrel 40 by pins 43, which preferably pass through elongated holes 44 in the dogs to permit a certain amount of play. Since the dogs are intended to prevent downward movement of the mandrel 40 under the force necessary to compress the packers, the lost motion provided by the elongated slots, permits the upper ends of the dogs to bear against the shoulders 45 formed in the mandrel 40, thus preventing the pins from taking the load of the cementing string. Spring means 37 are provided to normally hold the dogs 41 in the position shown in Figure 2.

In addition to their function of holding the mandrel 40 in place, the dogs 41 also serve to accurately locate the tool, so that when the packers are set, the tool will be in operative position with respect to the valve or other part of the casing string. For this reason, the dogs are formed with shoulders 46, and the valve body 10 has a corresponding shoulder 47 to be engaged by the shoulders 46 of the dogs 41. This shoulder 47 is formed by cutting a recess 48 in the valve body, said recess having its upper portion tapered as at 49, so as to urge the dogs 41 inwardly upon upward movement of the tool. A second shoulder 47' is provided in the upper part of the body member 10, for engagement by the dogs 41 when it is desired to test the packers against the blank pipe above the valve section V.

The above described construction permits relative movement between the two mandrels, with the lower mandrel accurately located in the casing. As was mentioned before, this movement is utilized to actuate the packers. As the function of the packing means is to provide a region within the casing which is in communication with the valve ports and with the interior of the cementing string, a pair of packers are utilized, which engage the wall of the fitting V or the casing when the cementing string is lowered with the dogs in place on a shoulder, and an intermediate sleeve 58 between the packers serves to transmit the compressing force from one to the other.

The upper packer assembly 50 comprises a pair of compression members 51 and 52, mounted for free rotational and axial movement on the mandrel 36. These compression members are so formed that one member telescopes within the other. That is to say, the upper member 51 has a sleeve 51a over which the member 52 is free to slide, suitable packing 54 being mounted on the sleeve 51a between the compression members 51 and 52. The approach of the compression surfaces of the members 51 and 52 expands the actual packing 54 into engagement with the wall of the body 10 of the valve in a well known manner.

The lower packer assembly 55 is of a similar construction to the upper packer assembly except that one of the compression surfaces is formed on the body of the lower mandrel 40 as indicated at 55a. The upper compression member 56 then merely slides along the mandrel 40 to compress the packing element 57, mounted on the mandrel 40.

The sleeve 58 separating the packers is arranged to transmit the compressive force from one packer to the other. For reasons which will hereinafter appear, it is necessary that this sleeve be permitted to turn with the mandrel 36, while the packers are set. In order to accomplish this, roller bearing elements 60 are provided between the collar 38 and the compression member 51; roller bearing elements 61 between the member 52 and the sleeve 58; and roller bearing elements 62 between the sleeve 58 and the member 56.

This completes the description of the packer actuating mechanism, and the mechanism by which the tool is accurately located in the well before the packers are set. It is proposed to provide means for gripping the interior of the valve sleeve when the packers are set, and for turning the sleeve to open and close the valve while the packers are in operative position. To this end, the relative axial movement between the sleeve 58 and the mandrel 36 during the compression of the packers, is utilized to cause gripping means to engage the interior of sleeve 14 (or the sleeve 25 in the form shown in Figure 5).

The sleeve 58 carries a number of wedge elements 63, mounted in slots 63a in the sleeve. Projections 64 at the ends of the wedge elements retain them in place, but permit them to be projected sufficiently to cause gripping of the sleeve 14. The mandrel 36 has wedge shaped projections 65 which project into the slots 63a, and thus prevent the sleeve 58 from turning on the mandrel 36. Downward movement of the mandrel relative to the sleeve causes the wedge elements to grip the sleeve 14, under the influence of the wedge projections 65.

As the interior of the sleeve 14 is accurately machined, it is possible to form the wedge elements to cause them to move out into engagement with the sleeve, and then permit the mandrel to continue its downward movement to perform the packing function. For this reason, co-operating flat portions 66 and 67 are provided on the wedge elements and projections respectively, these flat portions engaging as shown in Figures 4 and 5.

The wedge elements 63 cannot engage the sleeve 14 directly, because of the axial movement of the sleeve as it rotates. For this reason, face plates or gripping means 68 are mounted on the wedge elements by screws 69, working in elongated slots 70 in the face plates, thus permitting longitudinal movement of the plates on the wedge elements. Circumferential movement of the plates 68 with respect to the wedge elements 63, under the driving effort required to rotate the sleeve 14, is prevented by projections 71 in the face plates 68 extending into longitudinal slots 72 in the wedge elements. These slots may contain springs 73, which force the face plates against the sleeve 14, if the sleeve is a little too large, but the metal to metal contact between the interior of the face plate and the exterior of the wedge element is principally relied upon to produce the necessary pressure against the interior of the sleeve 14.

It is apparent that the face plates 68 should permit downward movement of the sleeve 14 (Figures 1–4) when they rotate the sleeve, or upward movements of the sleeve 25 (Figure 5) after the face plates are first engaged with the sleeve. For this reason, a spring 74 is provided in a recess 75 in the wedge element and engages a shoulder 76 on the face plate, to normally hold the face plate in an upper position. Downward movement of the face plate compresses this spring, as shown in Figure 4. On the other hand, with the form of valve shown in Figure 5, it is necessary to provide the face plate with the form of spring shown in that figure. This form is exactly as that shown in the other figures, with the exception that the shoulder 76' and the spring 74' are arranged to normally hold the face plate in a lower position.

All of the foregoing apparatus functions without reference to the hydraulic system of the well. That is to say, with the exception of the motion of the dogs 41 into engagement with the walls of the recess cut in the body 10, the tool is controlled by vertical movement of the cementing string and rotation thereof.

The hydraulic system consists of a bore 77, passing through the mandrel 36, through which cement and fluid are intended to pass to the region between the packers. In order to provide communication between the bore 77 and the space between the packers, the mandrel 36 is provided with one or more ports 78, and the sleeve 58 is provided with ports 79, in registry with the ports 78 in the mandrel when the packers are set. When the device is run into the well, the ports 78 and 79 would normally not be in registry. In order to provide communication, slots 80 forming reduced ports, are cut in the sleeve in such a position as to open into the ports 78 when the device is being run into the well. These slots permit circulation through the well when the tool has reached its approximate cementing position, to condition the well fluid before cementing is begun.

The position of the dogs 41 is controlled by starting and stopping the circulating pumps. That is, the dogs are moved outwardly into engagement by starting the pumps. The means for accomplishing this result is briefly a piston within the bore 77 of the mandrel, which is moved downwardly when the pressure in the bore 77 is increased by starting the pumps. A stem 81 supports the cone 42 for reciprocating movement, and a spring 82 normally holds the stem in the position shown in Figure 2. A second stem 84 is mounted for slidable movement in the headed member 39 of the mandrel 36, and is connected by a bearing 83 with the stem 81, so that there can be no relative axial movement between the stem 81 and the stem 84, although they are free to rotate with respect to each other.

The lower end portion of the bore 77 is of reduced diameter, forming a chamber as indicated by 77a, for loosely accommodating a piston 85. The piston 85 is so connected to the stem 84 that downward movement of the piston under fluid pressure when the pumps are started urges the dogs outwardly. A headed screw 86, and a spring 87, within the piston, cooperate to hold the piston in the position shown in Figure 2. Downward movement of the piston will cause the spring 87 to become loaded. If the device has been positioned with the dogs in a recess 48 or 48' such downward movement of the piston will overcome the weaker spring 82, and force the cone member downwardly, spreading the dogs. If, however, the dogs are not opposite a recess, the piston will merely press the dogs against the walls, so that downward movement of the entire tool until the dogs catch on the shoulder of a recess will assure that the tool is properly positioned for whatever operation is to be performed.

The operation of the device should now be clear. With the parts of the tool in the position shown in Figure 2, it is lowered into a well. Fluid flows freely into the interior of the mandrel 36 through the slots 80, whence it passes up the cementing string C as the string is lowered into the well. Upon reaching a position about ten feet or so above the point of cementing, the circulation pump is started, which causes fluid to flow out through slots 80, for the purpose of reconditioning the fluid in the well. This is necessary because the fluid will have become quite heavy in the time since preceding operations in the well. The starting of the pumps will depress the piston 85, which will tension the dogs 41, throwing them against the walls of the casing. This of course will serve no useful purpose, while the device is in this position, beyond moving the piston out of the way of the circulating fluid passing through the ports 78 and the slots 80. The arrangement is such, that as clearly shown in Figure 2, with the piston 85 in its normal or upper position, the piston substantially covers a large part of each port 78. By thus restricting the effective opening of the ports 78, substantial pressure may be built up on the piston 85 to force the dogs 41 outwardly to engaging position. And even after the piston 85 has been depressed a substantial part of its stroke so that it has uncovered the ports 78, the discharge from these ports 78 is still restricted by the reduced ports 80. This ensures the dogs 41 being forced outwardly and effectively maintained in their engaging position with substantial force until they engage the shoulder 47 or 47' and the cementing string c is supported by them. In this position the upper mandrel 36 moves downwardly with respect to the lower mandrel to expand the packers 50 and 55 to sealing engagement with the interior of the casing string. The intermediate sleeve 58 also moves downwardly at this time, but by a less amount due to its confinement between the packers, such movement serving to align the large ports 79 with the ports 78 as shown in Figure 4. This allows free discharge of fluid to the exterior of the sleeve 58, at the same time there is sufficient pressure on the piston 85 to maintain the dogs 41 in their projected positions on the shoulder 47 or 47'. After circulation is completed, it is desirable to test the packers 50 and 55 to determine whether they are in good condition. To do this, the device is lowered until the dogs 41 engage the shoulder 47', and the packers are opposite the blank pipe immediately above the shoulder. Lowering the cementing string will set the packers, and a test of the packers is easily made by starting the pumps to give any desired test pressure.

After it has been determined that the packers are in good condition, the device is raised slightly, after shutting off the pumps, and then lowered to a position immediately above the recess 48. If the pumps are again started, the dogs will be urged against the walls of this recess, and upon lowering of the device from the surface the dogs will engage the shoulder 47 of the recess, and hold the lower mandrel 40 stationary. Further lowering from the surface will compress the packers, forcing them into sealing engagement with the walls of the body 10, which compression is accompanied by a movement of the sleeve 58 relative to the mandrel 36. The relative movement between the mandrel 36 and the sleeve 58 causes the wedge mechanism to grip the knurled interior surface of the sleeve 14 (or sleeve 25, Figure 5). It also moves the ports 78 and 79 into registry. If the circulation pumps be operated after the tool is in this position, the pressure at the surface will also indicate whether the packings are in good shape and whether the valve in the casing is properly closed. The pumps are stopped, and the valve in the casing wall opened by rotating the cementing string C, after which cement may be forced down the cementing string, and will find its way out through the ports in the wall of the casing. When the calculated amount of cement has been put away behind the casing, the pumps are stopped, and the tool rotated again to close the casing valve.

In order to assure that there is no possibility of leakage after the valve is presumably shut, the pumps are again started, and the results observed. If there is no leakage, the pumps are stopped, and the cementing string is raised, which releases the face plates from the valve sleeve and allows the packers to contract out of engagement with the body member. Further upward movement will result in engagement between the head of the piston 85 and the bottom of the bore 77, and further movement will cause a direct pull on the member 84, through the screw 86, which will lift the cone member 42 from the position between the dogs 41. Continued upward movement will cause engagement between the headed member 39 and the shoulder of the lower mandrel 40, pulling the lower mandrel upwardly. This upward movement will allow the dogs to return to their normal position with the aid of springs 37. The circulation pump may then be started to clear the well casing and the cementing string of excess cement.

I claim:

1. In combination, a casing adapted for use in a well bore, said casing having a port in the wall thereof, an element within the casing movable between limits, means cooperating with said element to prevent passage of fluid through said port when said element is at either of said limits and to permit such passage when the element is intermediate said limits, said element being engageable for movement by a tool lowered from the mouth of said bore, said tool serving optionally to move said element from one of said limits, where passage of fluid is prevented, to an intermediate position where passage of fluid is permitted, and thence to the other limit where passage of fluid is again prevented.

2. A valved casing for use in a well bore, comprising a casing string, there being a port through the wall of the casing, a sleeve threadedly engaging the interior of the casing for movement between a pair of positions spaced axially with respect to the casing upon rotation of the sleeve relative to the casing, a pair of axially spaced means carried by the casing and cooperating respectively with said sleeve in either one of said positions to close said port, and permitting passage of fluid through said port when said sleeve is intermediate said positions, said sleeve being engageable by a tool lowered from the surface of the ground for rotating said sleeve.

3. A tool for use in a well casing having a sleeve valve in the interior thereof, comprising: a pair of mandrels secured together for free rotary movement and limited axial movement with respect to each other, one of said mandrels being secured to a tubing string extending to the mouth of said casing, means for optionally supporting the other mandrel against axial movement in the casing, packing means respectively on each of said mandrels, an intermediate sleeve between the packers, to expand the packers upon relative axial movement of said mandrels toward each other and cause said packers to seal respectively between said mandrels and the interior of the casing to form a confined space communicating with said valve, gripping means carried by said intermediate sleeve, and means forming cooperating wedge surfaces respectively attached to said gripping means and the mandrel secured to the tubing string, whereby movement of said mandrel with respect to said sleeve toward the other mandrel urges said gripping means radially outwardly to engage said sleeve valve to operate the valve upon rotation of said mandrel.

4. A tool for use in a well casing having a sleeve valve in the interior thereof, comprising: an upper mandrel secured to a tubing string extending to the mouth of said casing, a lower mandrel mounted on said upper mandrel for free rotary movement and limited axial movement with respect thereto, means on said lower mandrel for optionally supporting said mandrel in the casing and at a position so that said valve is intermediate said mandrels, packing means mounted on said lower mandrel, packing means rotatably mounted on the upper mandrel, a thrust bearing for transmitting axial movement from said upper mandrel to said packing means on the upper mandrel, an intermediate sleeve interposed between said packing means and non-rotatably connected to said upper mandrel and axially movable on both mandrels, thrust bearings interposed between the opposite ends of said sleeve and said packing means respectively, whereby relative movement of said mandrels toward each other causes said packing to seal respectively between said mandrels and the interior of said casing to form a confined space between the tool and the casing controlled by said valve, gripping means carried by said intermediate sleeve, and means forming cooperating wedge surfaces respectively attached to said gripping means and said sleeve, whereby movement of said sleeve in response to movement of said mandrels toward each other urges said means radially outward to engage said valve sleeve so that rotation of said intermediate sleeve serves to operate said valve.

5. A tool for use in a well casing having a sleeve valve in the interior thereof, comprising: an upper mandrel secured to a tubing string extending to the mouth of said casing, a lower mandrel mounted on said upper mandrel for free rotary movement and limited axial movement with respect thereto, means on said lower mandrel for optionally supporting said mandrel in the casing and at a position so that said valve is intermediate said mandrel, packing means mounted on said lower mandrel, packing means rotatably mounted on the upper mandrel, a thrust bearing for transmitting axial movement from said upper mandrel to said packing means, an intermediate sleeve interposed between said packing means and non-rotatably connected to said upper mandrel and freely axially movable on both mandrels, thrust bearings interposed between the opposite ends of said sleeve and said packing means respectively, whereby relative movement of said mandrels toward each other causes said packing to seal respectively between said mandrels and the interior of said casing to form a confined space between the tool and the casing controlled by said valve, gripping means for engaging the sleeve valve, said gripping means being carried by wedge elements and being movable in the direction of the mandrel axis with respect to said elements, wedge surfaces on said intermediate sleeve and cooperating with said wedge elements, whereby movement of said sleeve in response to movement of said mandrels toward each other urges said gripping means radially outward to engage said valve sleeve so that rotation of said intermediate sleeve serves to operate said valve, said gripping means moving axially with the valve sleeve.

6. A tool for use in connection with a well casing having a recess in the wall thereof, comprising: a body member, means mounting said member on a tubing string within said casing and extending to the mouth of the casing, for limited axial movement with respect to said string, projectable elements on said body member adapted to enter said recess, said tubing string being provided with a bore forming a chamber in communication with the interior of the tubing, a piston in said chamber, a wedge member for projecting said elements upon movement of said wedge member in one direction, means connecting said piston and said wedge member to move said wedge member in element projecting direction upon increase of pressure in said chamber, and means forming a connection between said wedge member and said body member upon predetermined upward movement of said body member with respect to said wedge member, whereby upward movement of the tubing is effective to withdraw said wedge member from element projecting position.

7. A tool for use in connection with a well casing having a recess in the wall thereof, comprising: a body member, means mounting said member on a tubing string within said casing and extending to the mouth of the casing, for limited axial movement with respect to said string, projectable elements on said body member adapted to enter said recess, said tubing string being provided with a bore forming a chamber in communication with the interior of the tubing, a piston in said chamber, and means whereby said piston is effective to project said elements upon outward movement of the piston from the chamber, there being a discharge port in the chamber, said piston restricting discharge from said port until said elements are at least partly projected.

8. In combination, a casing adapted for use in a well bore, said casing having a discharge port in the wall thereof, a closure element within the casing for said port and movable from a position permitting passage of fluid to a position closing said port, said element being engageable and movable by a tool lowered from the mouth of said bore, and means on said casing for engaging a portion of said tool to properly position the tool for engagement with the element.

9. A valved casing for use in a well bore, comprising a casing string, there being a port through the wall of the casing, a sleeve threadedly engaging the interior of the casing for axial movement with respect to the casing upon rotation of the sleeve relative to the casing, there being a recess between the casing and the sleeve and communicating with said port, a pair of axially spaced shoulders on the casing and extending into said recess on one side of said port, a sealing ring on said sleeve extending into said recess and adapted to engage either of said shoulders in response to axial movement of the sleeve, there being an opening through said sleeve spaced along the sleeve in the same direction from said sealing ring as the said shoulders are from the port along the casing, said opening being adapted to establish communication between the interior of the casing and said recess, engagement of the sealing ring with either of said shoulders serving to interrupt communication between said port and said opening, said sleeve when in a position with said sealing ring intermediate said shoulders establishing communication between the interior of the casing and said port, there being a space in said recess providing for fluid flow past the sealing ring.

10. In combination, a casing adapted for use in a well bore, said casing having a port in the wall thereof, valve means on the casing having a member operable for closing said port, a string of tubing insertible within said casing from the mouth of said bore and having axially spaced packing means thereon for sealing between said tubing string and said casing to form a confined space in communication with said port, and a port in said tubing located between said spaced packing means and opening into said confined space, to permit transfer of fluid between the interior of said tubing string and said first mentioned port without mingling with other fluid in the casing, and means on said tubing string for engaging said member and operating said valve in response to movement of the tubing string.

11. In combination, a casing adapted for use in a well bore, said casing having a port in the wall thereof, valve means on the casing having a member operable for closing said port, a string of tubing insertible within said casing from the mouth of said bore and having axially spaced packing means thereon for sealing between said tubing string and said casing to form a confined space in communication with said port, and a port in said tubing located between said spaced packing means and opening into said confined space to permit transfer of fluid between the interior of said tubing string and said first mentioned port without mingling with other fluid in the casing, means on said tubing string for causing said packing to seal against the casing, and means on said tubing string for engaging said member and operating said valve in response to movement of the tubing string, while said packing is sealing against the casing.

12. In combination, a casing adapted for use in a well bore, said casing having a port in the wall thereof, valve means on the casing operable upon rotation with respect to the casing for closing the port, a string of tubing insertible within said casing from the mouth of said bore and having axially spaced packing means thereon for sealing between said tubing string and said casing to form a confined space in communication with said port, and a port in said tubing located between said packing means and opening into said confined space to permit transfer of fluid between the interior of said tubing string and said first mentioned port without mingling with other fluid in the casing, and means on said tubing string for engaging and rotating said valve means whereby rotation of the tubing string operates the valve.

13. In apparatus for conducting fluid from a tubing string extending down a well casing, into a region in said casing; an upper mandrel adapted to be supported by said tubing string in said region, a lower mandrel slidably mounted on said upper mandrel for limited axial movement with respect thereto, a fixed compression member and a packer on each of said mandrels, an intermediate sleeve between the packers slidable with respect to both mandrels, said packers and said sleeve being confined between the compression members, whereby movement of said mandrels toward each other expands said packers into sealing relation with the casing means, dogs carried by said lower mandrel for engaging said casing and restricting movement of said lower mandrel axially therein, there being a bore in said upper mandrel in communication with said tubing string, a piston slidably mounted in said bore, and having a cross section occupying a substantial portion of the cross section of said bore, means on the piston engaging the dogs whereby movement of said piston from a normal position causes operation of said dogs to engaging position, means urging said piston toward normal position and means urging the dogs out of engaging position when the piston is in said normal position, there being a port through the wall of the upper mandrel at least partly covered by said piston when in its normal position, there being a reduced opening extending through said sleeve and placing said port in restricted communication with the exterior of the sleeve when said mandrels are so positioned that the packers are not expanded, there being an enlarged opening through said sleeve placing said port in unrestricted communication with the exterior of said sleeve of said region when said mandrels are in position expanding the packers.

14. A tool for use in a well casing having a sleeve valve in the interior thereof controlling a port through the wall of the casing, comprising: a pair of axially spaced mandrels, means connecting said mandrels together for free rotary movement and limited axial movement with respect to each other, one of said mandrels being adapted to be secured to a tubing string extending to the mouth of said casing, means for optionally supporting the other of said mandrels against axial movement in the casing, packing means on each of said mandrels adapted to seal between the respective mandrel and the casing, means for expanding said packing means to sealing condition upon relative axial movement between said mandrels in one direction, said packing means when expanded cooperating to form a confined space between the casing and the tool communicating with said valve, gripping means connected to rotate with said one mandrel and movable radially outwardly to engage the valve sleeve, and means whereby said relative axial movement between the mandrels causes radially outward movement of said gripping means to engage the sleeve valve whereby said valve is operated by rotation of said one mandrel.

15. A tool for use in a well casing having a sleeve valve in the interior thereof controlling a port through the wall of the casing, comprising: a pair of axially spaced mandrels, means connecting said mandrels together for free rotary movement and limited axial movement with respect to each other, one of said mandrels being adapted to be secured to a tubing string extending to the mouth of said casing, means for optionally supporting the other of said mandrels against axial movement in the casing, packing means on each of said mandrels adapted to seal between the respective mandrel and the casing, an intermediate sleeve slidingly mounted on said mandrels between said packing means for expanding said packing means, to form a confined space between the tool and the casing communicating with said valve upon relative axial movement between said mandrels in one direction, said sleeve being secured to rotate with said one mandrel, and gripping means mounted on said intermediate sleeve for rotation therewith and movable radially outwardly upon said axial movement between said mandrels to engage said valve sleeve, whereby rotation of said upper mandrel operates the valve.

16. A tool for use in a well casing having a sleeve valve in the interior thereof controlling a port through the wall of the casing, comprising: a pair of axially spaced mandrels, means connecting said mandrels together for free rotary movement and limited axial movement with respect to each other, one of said mandrels being adapted to be secured to a tubing string extending to the mouth of said casing, means for optionally supporting the other of said mandrels against axial movement in the casing to cause relative axial movement between the mandrels in response to axial movement of said one mandrel, and to locate the tool in position to operate the valve, packing means operable to form a confined space between the tool and the casing communicating with said valve upon relative axial movement between the mandrels in one direction, and means connecting the valve sleeve for operation by rotation of said one mandrel, comprising gripping means connected to rotate with said one mandrel and movable radially outwardly to engage the sleeve, and means whereby said axial movement between the mandrels causes radial outward movement of said gripping means.

LANDES H. HAYWARD.

REFERENCES CITED

The following references are of record in the file of this patent:

UNITED STATES PATENTS

| Number | Name | Date |
| --- | --- | --- |
| 2,197,078 | Kinley | Apr. 16, 1940 |
| 2,187,480 | Baker | Jan. 16, 1940 |
| 2,223,442 | Crowell | Dec. 3, 1940 |
| 1,510,669 | Halliday | Oct. 7, 1924 |
| 1,499,315 | Hallvorsen | June 24, 1924 |
| 2,210,815 | Linney | Aug. 6, 1940 |
| 2,239,296 | Robinson | Apr. 22, 1941 |
| 2,248,169 | Granger | July 8, 1941 |
| 2,168,735 | Gilstrap et al. | Aug. 8, 1939 |
| 2,291,371 | Buchanan et al. | July 28, 1942 |
| 2,214,555 | Hayward et al. | Sept. 10, 1940 |
| 577,812 | Tadder | Feb. 23, 1897 |
| 1,619,268 | Rasmussen | Mar. 1, 1927 |
| 2,295,822 | Armentrout | Sept. 15, 1942 |
| 2,116,465 | Patterson | May 3, 1938 |
| 1,850,484 | Watkins | Mar. 22, 1932 |
| 2,196,657 | Burt | Apr. 9, 1940 |
| 2,191,750 | Brown | Feb. 27, 1940 |
| 2,344,120 | Baker | Mar. 14, 1944 |